United States Patent
Lauffenburger et al.

(10) Patent No.: US 7,161,585 B2
(45) Date of Patent: Jan. 9, 2007

(54) DISPLACEMENT DATA POST-PROCESSING AND REPORTING IN AN OPTICAL POINTING DEVICE

(75) Inventors: James Harold Lauffenburger, Colorado Springs, CO (US); Gil Afriat, Colorado Springs, CO (US); Robert R. Rotzoll, Green Mountain, CO (US)

(73) Assignee: EM Microelectronic-Marin SA, Marin (CH)

( * ) Notice: Subject to any disclaimer, the term of this patent is extended or adjusted under 35 U.S.C. 154(b) by 427 days.

(21) Appl. No.: 10/609,676

(22) Filed: Jul. 1, 2003

(65) Prior Publication Data
US 2005/0001817 A1  Jan. 6, 2005

(51) Int. Cl.
*G09G 5/08* (2006.01)
*G09G 5/00* (2006.01)
*H01L 31/14* (2006.01)

(52) U.S. Cl. ............. 345/166; 345/175; 345/179; 250/553

(58) Field of Classification Search ........ 345/156–159, 345/161–167, 173–176, 179–183; 715/856–859; 178/18.01, 18.03, 18.09, 18.11, 19.05; 250/552, 250/553
See application file for complete search history.

(56) References Cited

U.S. PATENT DOCUMENTS

| | | | |
|---|---|---|---|
| 5,288,993 A | 2/1994 | Bidiville et al. | |
| 5,530,455 A * | 6/1996 | Gillick et al. ............. | 345/163 |
| 5,578,813 A | 11/1996 | Allen et al. | |
| 5,644,139 A | 7/1997 | Allen et al. | |
| 5,703,356 A | 12/1997 | Bidiville et al. | |
| 6,052,115 A * | 4/2000 | Gregg et al. .............. | 345/159 |
| 6,057,540 A | 5/2000 | Gordon et al. | |
| 6,281,882 B1 * | 8/2001 | Gordon et al. ............ | 345/166 |
| 6,303,924 B1 * | 10/2001 | Adan et al. ................ | 250/221 |
| 6,513,055 B1 * | 1/2003 | Boran ....................... | 708/551 |
| 6,677,929 B1 * | 1/2004 | Gordon et al. ............ | 345/156 |
| 6,774,915 B1 * | 8/2004 | Rensberger ............... | 345/660 |
| 2003/0102425 A1 | 6/2003 | Rotzoll et al. | |
| 2003/0103037 A1 | 6/2003 | Rotzoll | |
| 2005/0041885 A1 * | 2/2005 | Russo ....................... | 382/289 |
| 2005/0062720 A1 * | 3/2005 | Rotzoll et al. ............ | 345/166 |

FOREIGN PATENT DOCUMENTS

| | | |
|---|---|---|
| EP | 1 095 821 A2 | 3/2001 |
| EP | 1 182 606 A2 | 2/2002 |
| EP | 1 291 810 A2 | 3/2003 |
| WO | WO 03/049018 A1 | 6/2003 |

* cited by examiner

*Primary Examiner*—Bipin Shalwala
*Assistant Examiner*—Jeff Piziali
(74) *Attorney, Agent, or Firm*—Sughrue Mion, PLLC

(57) ABSTRACT

There is described a method of post-processing and reporting detected displacement in an optical pointing device as well as a sensing device for an optical pointing device implementing this method. Displacement is detected and a first count representative of a magnitude of the detected displacement is accumulated in an associated accumulation unit, this first count representing the magnitude of the detected displacement at a first resolution (or detection resolution). The first count accumulated in the accumulation unit is processed to convert this first count into a report count representing the magnitude of the detected displacement at a second resolution (or reporting resolution) lower than the first resolution. This report count is then reported, for instance to a PC or an external controller. These operations are repeated to generate periodic motion reports at the second resolution.

23 Claims, 4 Drawing Sheets

DISPLACEMENT DATA POST-PROCESSING AND REPORTING IN AN OPTICAL POINTING DEVICE

FIELD OF THE INVENTION

The present invention generally relates to optical pointing devices and more particularly to post-processing and reporting of detected displacement in such optical pointing devices.

BACKGROUND OF THE INVENTION

Optical pointing devices are already known in the art. U.S. Pat. No. 5,288,993 for instance discloses a cursor pointing device utilizing a photodetector array and an illuminated target ball having randomly distributed speckles. U.S. Pat. No. 5,703,356 (related to the above-mentioned U.S. Pat. No. 5,288,993) further discloses (in reference to FIGS. 23A and 23B of this document) an optical cursor pointing device in the form of a mouse which does not require a ball and wherein light is reflected directly from the surface over which the pointing device is moved.

In both cases, the optical pointing device includes a light source for repetitively illuminating a surface portion (i.e. a surface portion of the ball or a portion of the surface over which the optical pointing device is moved) with radiation and an optical sensing unit comprising a photodetector array including a plurality of pixels each having a photosensitive element which is responsive to radiation reflected from the illuminated surface portion. The pixels outputs of the photodetector array are typically coupled to conditioning and processing circuits for tracking and extracting information about the relative motion between the sensing unit and the illuminated surface portion.

The technique used in above-cited U.S. Pat. Nos. 5,288,993 and 5,703,356 in order to extract motion-related information is based on a so-called "Edge Motion Detection" technique. This "Edge Motion Detection" technique essentially consists in a determination of the movement of edges (i.e. a difference between the intensity of pairs of pixels) in the image detected by the photodetector array. Edges are defined as spatial intensity differences between two pixels of the photodetector array. The relative motion of each of these edges is tracked and measured so as to determine an overall displacement measurement which is representative of the relative movement between the photodetector array and the illuminated portion of the surface.

An improved motion detection technique based on the above "Edge Motion Detection" technique is the subject matter of a pending international application No. PCT/EP 02/13686 filed on Dec. 3, 2002 (under priority of U.S. provisional application No.60/335,792 of Dec. 5, 2001) in the name of EM Microelectronic-Marin SA and entitled "Method and sensing device for motion detection in an optical pointing device, such as an optical mouse" (this international application is published under No. WO 03/049018 A1). The above international application describes various motion detection algorithms which are all based on a common basic assumption, i.e. that motion of the sensor with respect to the illuminated surface between two successive measurements is less than the pixel pitch, i.e. the spacing between adjacent pixels of the photodetector array.

For performance reasons, it is highly desirable to design the motion sensing part of the optical pointing device so as to exhibit a high detection resolution. On the other hand, a PC or external controller to which the detected displacement are to be reported does not require high resolution motion reports. An appropriate reporting scheme accordingly needs to be proposed so as to "shape" the motion reports to the resolution required by the PC or external controller. It is an object of the present invention to provide such a reporting scheme.

SUMMARY OF THE INVENTION

According to a first aspect of the invention, there is provided a method of post-processing and reporting detected displacement in an optical pointing device comprising the steps of (a) detecting the displacement and accumulating a first count representative of a magnitude of the detected displacement in an associated accumulation unit, this first count representing the magnitude of the detected displacement at a first resolution; (b) processing the first count accumulated in the accumulation unit to convert this first count into a report count representing the magnitude of the detected displacement at a second resolution lower than the first resolution; (c) transmitting the report count; and (d) repeating steps a) to c).

According to one embodiment, converting the first count into the report count includes (i) multiplying the first count with a resolution scaling factor defined as the ratio of the second and first resolutions, and (ii) truncating the multiplied first count to an integer number. Preferably, prior to repeating steps (a) to (c) above, the method further includes subtracting the transmitted report count from the accumulation unit thereby leaving in the accumulation unit a residual count representative of a residual unreported magnitude of displacement, subsequent accumulation of the first count in the accumulation unit being performed starting from this residual count.

Other advantageous embodiments of the above method are the subject-matter of the dependent claims.

According to a second aspect of the invention, there is provided a sensing device for an optical pointing device comprising a motion sensing unit for detecting and measuring displacement with respect to an illuminated surface and a post-processing unit for post-processing and reporting the detected displacement, the post-processing unit including an accumulation unit for accumulating a first count representative of a magnitude of displacement detected and reported by the motion sensing unit, the first count being representative of the magnitude of the detected displacement at a first resolution, and the post-processing unit further including means for converting the first count accumulated in the accumulation unit into a report count representative of the magnitude of the detected displacement at a second resolution lower than the first resolution.

Advantageous embodiment of the above sensing device are the subject-matter of the dependent claims.

Other aspects, features and advantages of the present invention will be apparent upon reading the following detailed description of non-limiting examples and embodiments made with reference to the accompanying drawings.

DETAILED DESCRIPTION OF THE INVENTION

Figure 1:
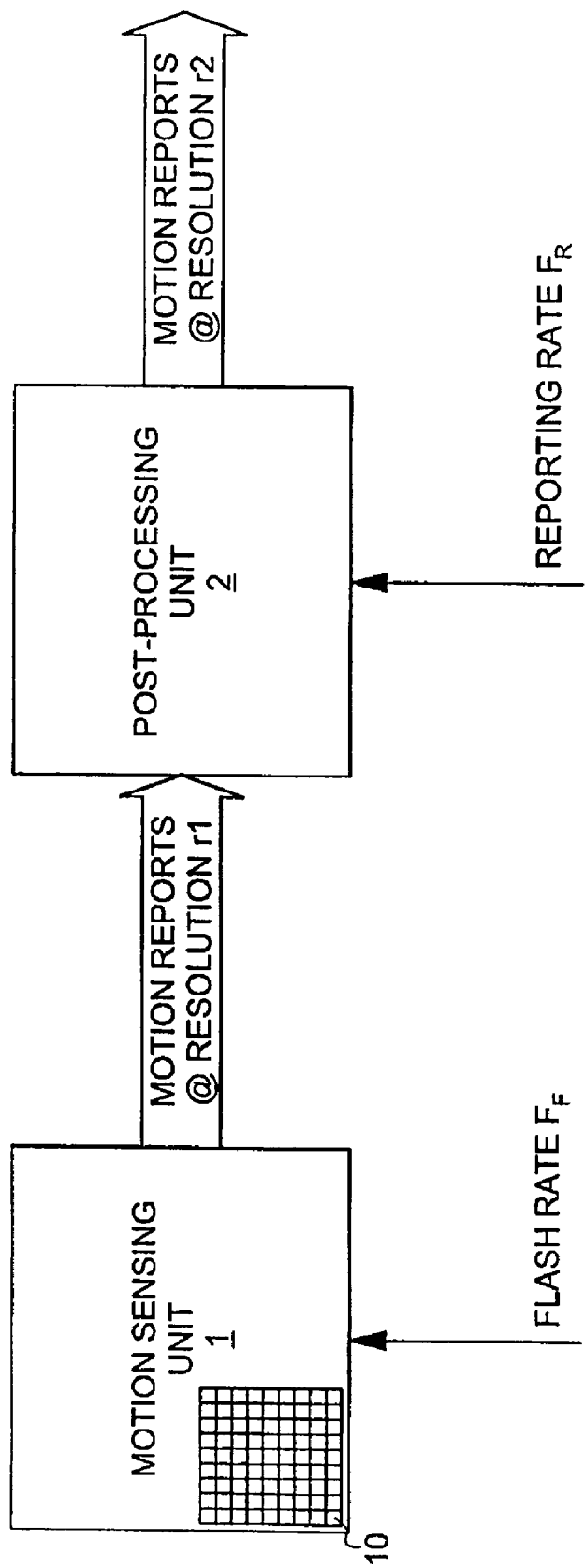
FIG. 1 schematically illustrates the global architecture of a sensing device for an optical pointing device comprising a motion sensing unit coupled to a post-processing unit.

FIG. 1 schematically illustrates the global architecture of a sensing device for an optical pointing device within the scope of the present invention. Components or parts that are not directly related to the subject-matter of the invention are not illustrated. The sensing device of FIG. 1 thus essentially comprises two units coupled together. The first unit, designated globally by reference numeral 1, is a motion sensing unit the purpose of which is to optically detect and measure displacement with respect to an illuminated surface and report the detected displacement to the second unit. The second unit, designated globally by reference numeral 2, is a post-processing unit the purpose of which is to process the motion reports transmitted by motion sensing unit 1 before being retransmitted to a PC or an external controller. This post-processing in particular includes conversion of the motion reports to a resolution required by the PC or external controller.

Motion sensing unit 1 basically includes an optical sensor comprising a photodetector array 10 with a plurality of pixels, which sensor is coupled to processing circuitry for extracting motion information from the image of the illuminated surface captured by the optical sensor. The surface is typically illuminated by means of one or more light sources not represented in FIG. 1. We will not describe in detail the structure and operation of this motion sensing unit. A detailed explanation and description of the operation of motion sensing unit 1 and of its motion detection principle may be found in pending International Application No. PCT/EP 02/13686 entitled "Method and sensing device for motion detection in an optical pointing device, such as an optical mouse" (published as WO 03/049018). For reference, International Application No. PCT/EP 02/13686 was filed in the name of EM Microelectronic-Marin SA on Dec. 3, 2002 under priority of pending U.S. non-provisional patent application No. 10/001,963 of Dec. 5, 2001 entitled "Method, sensing device and optical pointing device including a sensing device for comparing light intensity between pixels" (published as U.S. 2003/0102425 A1—cf. also WO 03/049017 A1) and of U.S. provisional application No. 60/335,792 of Dec. 5, 2001 entitled "Method and sensing device for motion detection in an optical pointing device, such as an optical mouse".

Within the scope of the present invention, it suffice to say that the motion sensing unit 1 outputs motion reports that are each representative of a magnitude and direction of the displacement detected by the motion sensing unit 1. These motion reports consist of positive or negative counts (i.e. signed integer values) that are representative of the magnitude and direction of the detected displacement at a first resolution (or detection resolution). This resolution is expressed as counts or digits per unit of distance, e.g. cpi (counts per inch) or cpmm (counts per millimetre). The corresponding magnitude and direction of the detected displacement can thus be expressed as the reported motion count divided by the appropriate resolution. Motion reports are provided for each axis of displacement (x and y).

The motion reports from motion sensing unit 1 are transmitted to post-processing unit 2 where they are post-processed and retransmitted to the PC or external controller. More particularly, within the scope of the present invention, prior to being reported by post-processing unit 2, the motion reports transmitted by motion sensing unit 1 are processed so as to convert their resolution to a second resolution (or reporting resolution) as required by the PC or external controller, which second resolution is lower than the first resolution. In practice, the reporting resolution may conveniently be 400 or 800 cpi. The motion reports outputted by post-processing unit 2 again consist of positive or negative counts that are representative of the magnitude and direction of the detected displacement, this time however at the reporting resolution. Direction of displacement is not as such affected by post-processing unit 2. Conversion to the lower reporting resolution only affects the absolute value of the reported count. The reported magnitude of displacement basically remains the same except for minor differences that are due to the resolution conversion. Those minor differences do not however exceed the inverse of the reporting resolution, namely $2.5 \; 10^{-3}$ inch at 400 cpi or $1.25 \; 10^{-3}$ inch at 800 cpi.

According to a preferred embodiment, the rate at which the motion reports are transmitted from unit 1 to unit 2 is selected to be substantially higher than the rate at which they are reported to the PC or external controller, and post-processing unit 2 implements an accumulation mechanism for accumulating the motion reports transmitted by unit 1 between each post-processed report from unit 2. This is preferable taking account of the fact that the motion reports from motion sensing unit 1 may be pretty noisy due to the stochastic nature of the implemented motion detection algorithm. By accumulating several motion reports from motion sensing unit 1, noise is averaged and thereby filtered to some extent.

According to a specific embodiment, the motion reports from unit 1 and unit 2 are outputted as binary words comprising a predetermined number of bits representing magnitude and direction of the detected displacement (i.e. several bits for coding magnitude of displacement plus one bit for coding direction of displacement). According to a non limiting example, the motion reports from both units may be sign magnitude 8-bit words, i.e. seven bits are used for coding the magnitude of the detected displacement and one bit is used for coding direction of displacement. Counts reported by units 1 and 2 may thus range from "−127" to "+127".

Within the scope of a preferred embodiment, motion sensing unit 1 implements a motion detection algorithm as described in pending International Application No. PCT/EP 02/13686 (WO 03/049018 A1) mentioned above. By adopting such a motion detection principle, it shall be mentioned that each motion report outputted by motion sensing unit 1 will be representative of a displacement the magnitude of which is a fraction of the pixel pitch, i.e. the reported displacement has a magnitude less than the spacing between adjacent pixels of the photodetector array 10. Indeed, one basic assumption of the various motion detection principles described in International Application No. PCT/EP 02/13686, resides in the fact that displacement with respect to the illuminated surface (under normal operating conditions) is less than the pixel pitch between each sensor flash (a "flash" shall mean that the sensor takes a "picture" of the illuminated surface pattern and calculates the sensor displacement since the previous flash).

Taking account of the above assumption and of the fact that the motion reports are illustratively outputted as sign magnitude 8-bit words, it will be understood that a maximum motion report of "+127" from unit 1 means that the detected displacement is $\pm 127/128$ times the pixel pitch. The least significant bit (LSB) in the reported words thus represents $\frac{1}{128}^{th}$ of the pixel pitch in this example. In general, the resolution of motion sensing unit 1 (the so-called "first resolution" or "detection resolution") can accordingly be defined by the following expression:

$$r1 = \frac{2^{N0}}{pp} \quad (1)$$

where r1 is the detection resolution, N0 is the number of bits for coding the magnitude of displacement reported by motion sensing unit 1 (seven in this example) and pp is the pixel pitch. Assuming that the pixel pitch is 100 μm, the detection resolution can thus be determined to be 32,512 cpi (or 1,280 cpmm).

Within the scope of the above-mentioned preferred embodiment, the "flash" rate is selected to be sufficiently high so that the magnitude of the displacement detected during each flash is less than the pixel pitch (as long as the speed of displacement is below a specified limit). Let us assume that motion sensing unit 1 and its motion detection principle are designed to reliably and accurately detect motion at least up to a desired and specified maximum speed of displacement, designated $V_{SPEC}$, this specified maximum speed of displacement being of course selected within the detectable speed range of motion sensing unit 1 (the maximum speed of displacement detectable by motion sensing unit 1 being generally greater to provide a sufficient safety margin in terms of accuracy and reliablity). In order to ensure that the detected magnitude of displacement is always inferior to the pixel pitch as long as the displacement speed is within the specified range, one will understand that the flash rate necessarily has to be greater than a minimum flash rate value (designated below as $F_{Fmin}$) defined by the following expression:

$$F_{Fmin} = \frac{v_{SPEC}}{pp} \quad (2)$$

where pp is again the pixel pitch. In practice, the flash rate $F_F$ is preferably selected to be substantially higher than the above minimum value for better performance.

A practical value for the specified maximum speed of displacement can be 16 inch/s or higher. With a pixel pitch of 100 μm, this speed of displacement of 16 inch/s implies a flash rate necessarily superior to approx. 4 kHz, at least 10 kHz in the present example offering a suitable safety margin.

One will also understand that the flash rate cannot exceed a certain value, taking account of the required acquisition time and processing time of motion sensing unit 1 to capture an image of the illuminated the surface and process the captured data to extract the motion related information therefrom. The time required by post-processing unit 2 to post-process and report the detected motion also adds up to the minimum processing time of unit 1. As an illustrative example, a maximum flash rate value in the present example can be determined to be approximately 20 kHz, this value being again given as a non limiting example. Within the scope of the above numerical example, the flash rate can thus be determined to be illustratively comprised between 10 kHz and 20 kHz As already mentioned above, the reporting rate of post-processing unit 2, i.e. the rate at which post-processing unit 2 reports the post-processed motion reports, is preferably substantially less than the above flash rate. The reporting rate may conveniently be 100 Hz in the above case (i.e. one motion report is transmitted by post-processing unit 2 every 10 ms). This numerical example is again purely illustrative and shall not be regarded as limiting the scope of the invention. In addition, as this will be understood from the following, the reporting rate is not necessarily fixed but may be adjusted if necessary. It shall be appreciated that the reporting rate needs however to be higher than a minimum that depends on different factors, in particular the specified maximum speed of displacement ($v_{SPEC}$), the detection resolution (r1) and the capacity of post-processing unit 2 to accumulate motion reports from motion sensing unit 1 between each report to the PC or external controller.

Figure 2:
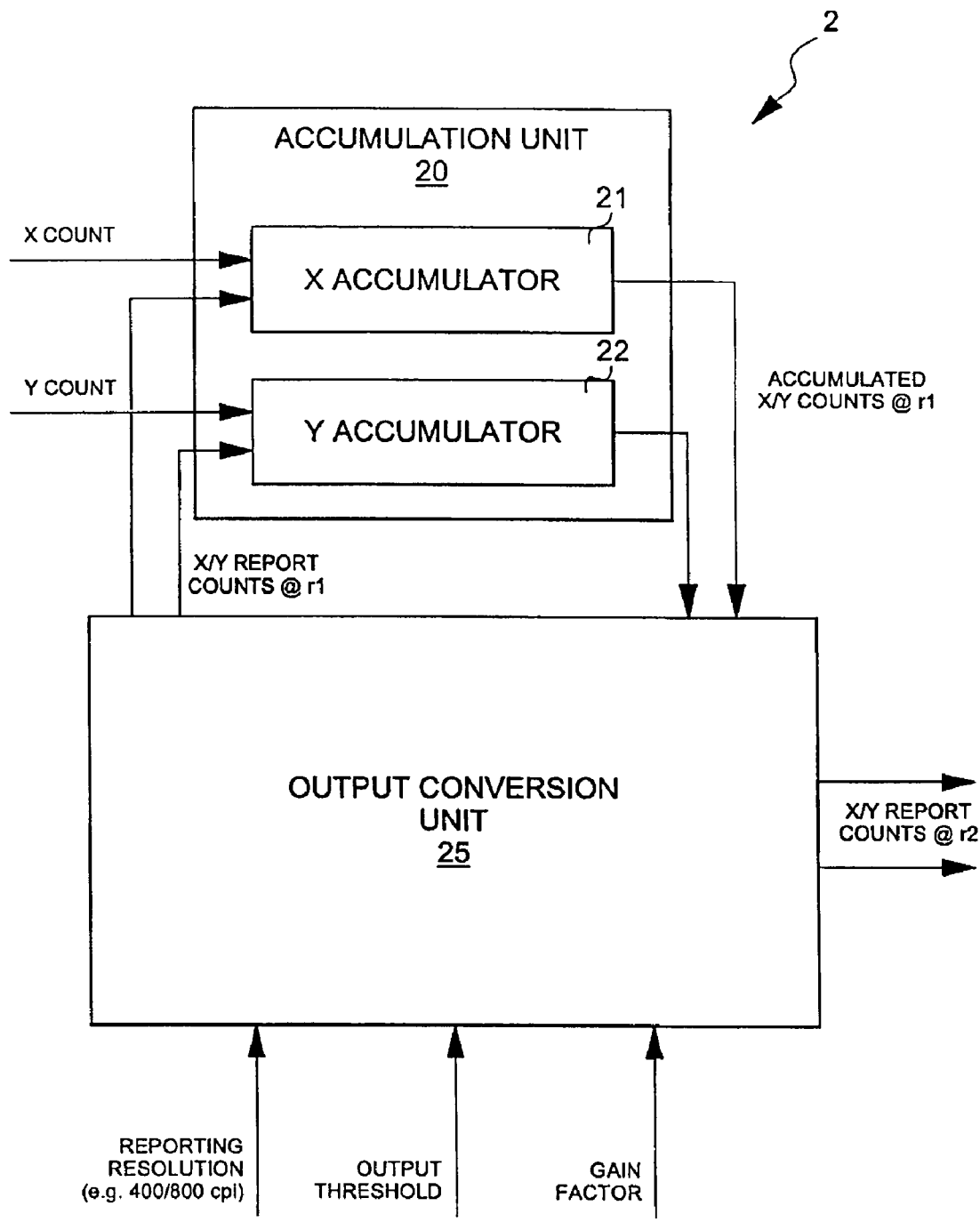
FIG. 2 is a more detailed view of the post-processing unit of FIG. 1.

In the preferred embodiment, since the reporting rate of post-processing unit 2 is substantially lower than the rate at which motion sensing unit 1 transmits its individual motion reports, an accumulation mechanism needs to be implemented. To this end, as shown in FIG. 2, post-processing unit 2 includes an accumulation unit 20 for accumulating the individual motion reports transmitted by motion sensing unit 1 between each post-processed report. More particularly, accumulation unit 20 includes at least a first accumulator 21 for accumulating motion reports representative of displacement detected along the x axis and at least a second accumulator 22 for accumulating motion reports representative of displacement detected along the y axis.

The capacity of accumulators 21, 22 is to be selected so that overflow thereof may not occur taking account of the maximum detectable speed of displacement, of the detection resolution and of the report rate of post-processing unit 2. Within the scope of the above example, the accumulators 21, 22 may conveniently be 2's complement 14-bit accumulators (i.e. accumulators having thirteen bits for storing magnitude of displacement and one bit for storing direction). As this will be appreciated hereinafter, the accumulator capacity may advantageously be increased to 15 bits to provide increased flexibility and performance.

One will understand that the counts accumulated in each of accumulators 21 and 22 will essentially represent the sum of a plurality of individual motion reports from motion sensing unit 1, the resolution of the accumulated counts being the same as that of the individual motion reports transmitted by unit 1. Assuming that the reporting rate is set to 100 Hz and the flash rate is set to 10 kHz, hundred individual motion reports will be transmitted by motion sensing unit 1 and accumulated in post-processing unit 2 before the accumulated result is reported to the PC or external controller. Again, this implementation is advantageous in the sense that a mechanism is thereby provided for filtering the noise from the reported motion data.

The outputs of both accumulators 21, 22 are coupled to an output conversion unit 25, the essential purpose of which is to convert the accumulated counts to counts expressing the corresponding magnitude of displacement at the selected reporting resolution (e.g. 400 cpi or 800 cpi). According to a preferred embodiment, conversion of each motion count accumulated in unit 20 includes (i) multiplying the accumulated motion count with a resolution scaling factor defined as the ratio of the second and first resolutions, and (ii) truncating the result of this multiplication to correspond to an integer number. The following numerical example will illustrate these operations.

Referring to the above numerical values, i.e. a detection resolution (or first resolution) of 32,512 cpi and a reporting resolution (or second resolution) of 800 cpi, the resolution scaling factor can be defined as the ratio 800/32,512. Let us now assume that the accumulated count in accumulation unit 20 (for one axis) is "+4000" which represents a positive displacement having a magnitude of approximately 0.123 inch (=4,000/32,512). Multiplication by the scaling factor leads to a result value of +98.425 and, after truncation to the nearest integer number, to a count of "+98". At 800 cpi, this represents a positive displacement having a magnitude of 0.1225 inch (=98/800). At 400 cpi, the result count would be "+49" which also corresponds to a positive displacement having a magnitude of 0.1225 inch (=49/400).

It will be appreciated that conversion to the lower reporting resolution may lead to a small difference between the magnitude represented by the count accumulated in unit 20 and the magnitude represented by the reported count. In the above example, a residual magnitude of displacement of approximately +0.5 $10^{-3}$ inch is left unreported (which is less than the inverse of the reporting resolution as already mentioned). This residual unreported motion may be discarded, i.e. the accumulators 21, 22 may be reset after the corresponding motion report has been outputted by unit 2. Preferably, the displacement reported by unit 2 is subtracted from the corresponding accumulator so as to leave therein a residual count corresponding to the unreported residual displacement and subsequent accumulation begins from this residual count. Returning to the above numerical example, the residual unreported count remaining in the accumulator after subtraction of the reported count would be "+17". This alternative solution helps improving the performance and accuracy of the whole system.

Figure 3:
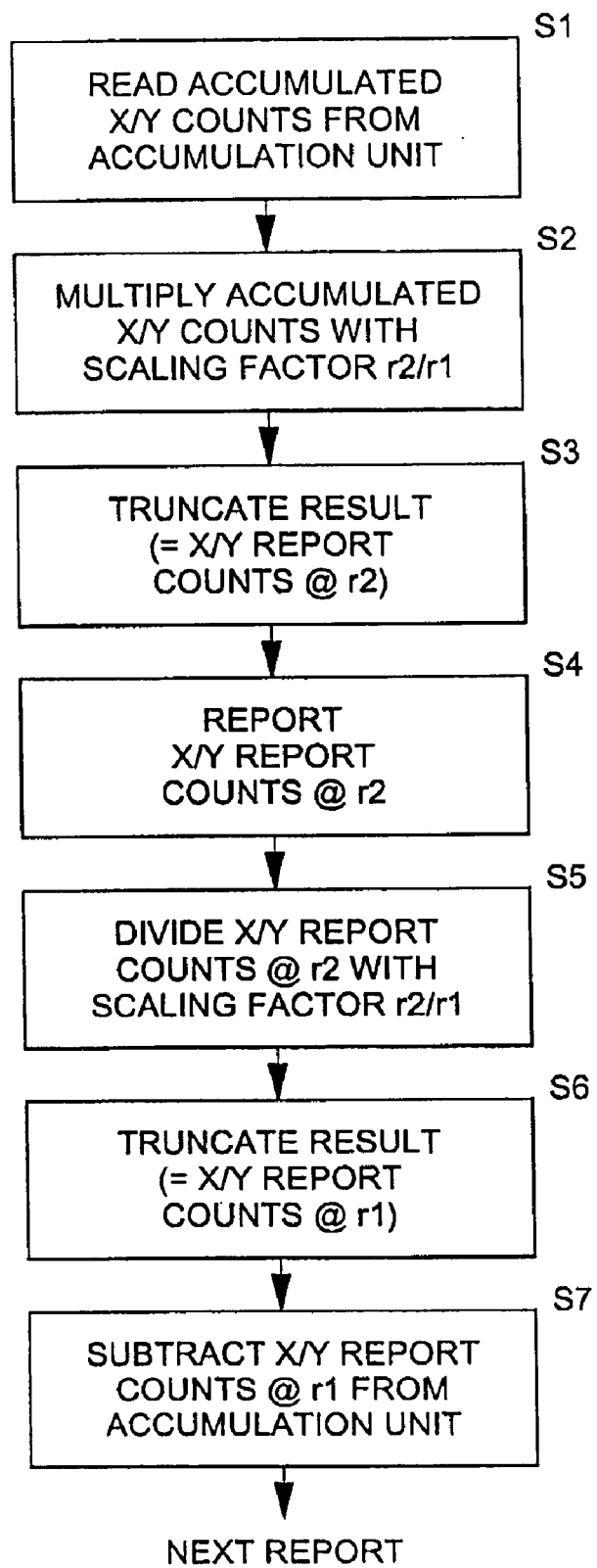
FIG. 3 is a flow chart illustrating schematically the chronological operations for converting and outputting motion reports according to an embodiment.

FIG. 3 is a flow chart illustrating schematically the chronological operations of output conversion unit 25 according to an embodiment where residual unreported motion is left in accumulation unit 20 for subsequent accumulation.

At step S1, the respective counts accumulated in accumulators 21 and 22 (x/y counts) are read by unit 25. At step S2, these counts are multiplied by the corresponding resolution scaling factor r2/r1 (r2 being the reporting resolution while r1 is the detection resolution). The integer part of each result of this multiplication step corresponds to the count to be reported at the selected reporting resolution r2 ("x/y report counts @ r2"). The x/y report counts at the reporting resolution are thus obtained from truncation at step S3 of the results of the multiplication of the x/y counts and of the resolution scaling factor. These x/y report counts are then reported at step S4 to the PC or external controller.

Next, in order to keep information about the unreported displacement resulting from the resolution conversion, the x/y report counts are converted again to the detection resolution for subtraction. This is achieved at step S5 by dividing the x/y report counts calculated at step S3 by the resolution scaling factor r2/r1. The integer part of the result of this division corresponds to the reported count at the detection resolution r1 ("x/y report counts @ r1"). The x/y report counts at the detection resolution are thus obtained from truncation at step S6 of the results of the divisions of step S5. At step S7, these counts are then subtracted from the x/y counts accumulated in the corresponding accumulators 21, 22.

As mentioned above, the capacity of accumulation unit 20, the reporting rate and the flash rate have to satisfy certain conditions and rules. Regarding the flash rate, this rate has to be chosen to satisfy the assumption which states that the magnitude of the displacement shall be less than the pixel pitch as long as the speed of displacement is less than the specified maximum speed of displacement $v_{SPEC}$.

At a displacement speed of 16 inch/s as specified above, the corresponding magnitude of the displacement is 1.6 $10^{-3}$ inch at a flash rate of 10 kHz or 0.8 $10^{-3}$ inch at a flash rate of 20 kHz. Let us assume that the displacement is parallel to one of the axis of detection, the corresponding count for that axis, as reported by motion sensing unit 1, will be around "52" at a flash rate of 10 kHz and around "26" at a flash rate of 20 kHz (these counts may be higher or lower in practice taking account of the performance and accuracy of the motion detection algorithm).

Assuming that the reporting rate is fixed to 100 Hz, accumulation unit will accumulate up to a maximum count of approximately "5200" which is not dependent on the selected flash rate but depends essentially on the specified maximum speed of displacement, on the detection resolution and on the reporting rate. As a general rule, the maximum accumulated count, designated $AC_{SPEC}$, accumulated in unit 20 when the sensor is moving at the specified maximum speed of displacement can be expressed by the following expression:

$$AC_{SPEC} \cong \frac{F_F}{F_R} \cdot \text{truncate}\left[\frac{v_{SPEC}}{F_F} \cdot r1\right] \approx \frac{v_{SPEC}}{F_R} \cdot r1 \qquad (3)$$

where $F_F$ is the flash rate, $F_R$ is the reporting rate, $v_{SPEC}$ is the specified maximum speed of displacement and r1 is again the detection resolution.

One will of course understand that the capacity of accumulation unit 20 has to be sufficient to allow accumulation of the above maximum count. In the above example, the maximum count of "5200" requires at least thirteen bits of accumulation capacity. Each accumulator thus requires a minimum of thirteen bits for coding the magnitude of displacement plus one bit for coding the direction of displacement, i.e. fourteen bits in total.

In order to prevent overflow of the reports (i.e. that the counts accumulated in accumulation unit 20 exceed the maximum reportable count), the maximum count that can be accumulated in each of the accumulators of accumulation unit 20 is preferably limited. Taking account of the fact that the motion counts are reported as binary words having a determined number of bits, reporting overflow would occur if the accumulated count exceeds a maximum value, designated $AC_{MAX}$, as defined in the following expression:

$$AC_{MAX} \cong (2^{N2} - 1)\frac{r1}{r2} \qquad (4)$$

where N2 is the number of bits allocated to the reporting of the detected magnitude of displacement.

In the above example, the motion reports are outputted by unit 20 as sign magnitude 8-bit words. Reporting overflow can thus be prevented by ensuring that each accumulator does not accumulate beyond a maximum count of "5200" at the high reporting resolution of 800 cpi. One will appreciate that this count advantageously correspond in this example to the estimated maximum count $AC_{SPEC}$ defined in expression (3) above. At 400 cpi, accumulation may similarly be limited to a count of "5200" as well. The counts reported by post-processing unit 2 will accordingly be comprised between "−127" and "+127" at the selected reporting resolution of 800 cpi. At the reporting resolution of 400 cpi, full reporting scale will not be reached however and the reports will be comprised between "−63" and "+63".

Alternatively, instead of fixing a determined reporting rate, the output rate of post-processing unit 2 may be adjusted as a function of the selected reporting resolution. Referring to the above example, the reporting rate would still be 100 Hz at 800 cpi, but could be decreased to half at 400 cpi, i.e. to 50 Hz. This would require one additional accumulation bit for each accumulator of unit 20 (i.e. 2's complement 15-bit accumulators instead of the previous 14-bit accumulators) since the maximum count that can be accumulated at the reduced reporting rate of 50 Hz will go up to approximately "10400". In this case, reporting overflow will be prevented by ensuring that the accumulators 21, 22 to do not accumulate beyond a maximum count of "5200" at the selected reporting resolution of 800 cpi and "10400" at the selected reporting resolution of 400 cpi. In this case, the maximum count that can be reported by unit 2 will be "+127" at both reporting resolutions, i.e. full scale reports. Reduction of the reporting rate may be advantageous in terms of power consumption.

It will be appreciated that the above reporting principle inevitably exhibits a limitation in terms of the maximum speed of displacement that can be reported. Indeed, since a determined reporting rate and determined number of bits is used for reporting the motion counts, the maximum reportable speed of displacement, designated $v_{MAX-REPORT}$, will be given by the following expression:

$$v_{MAX-REPORT} = \frac{C_{MAX}}{r2} \cdot F_R \qquad (5)$$

where $C_{MAX}$ is the maximum reported count, r2 is the reporting resolution and $F_R$ is the reporting rate.

Provided that the full scale of motion is reported, i.e. all report bits are used for reporting the detected displacement, the maximum reported count $C_{MAX}$ will be equal to $2^{N2}-1$ where N2 is the number of bits used for reporting the magnitude of the detected displacement. In the above example where seven bits are used for reporting magnitude of displacement, the maximum reportable speed of displacement will accordingly be around 16 inch/s. One will appreciate that the reporting rate and the number of bits used for reporting the magnitude of displacement should be selected so as to allow a maximum reportable speed of displacement that is as close as possible to the specified maximum speed of displacement $v_{SPEC}$ defined above.

For the purpose of illustration, let us now assume that the specified maximum speed of displacement is raised to 20 inch/s, the above-mentioned values for the reporting rate and number of bits used for reporting magnitude of displacement will limit the performance of the whole system. In order to more closely match the specified maximum speed of displacement, the reporting rate should accordingly be increased in the present example to approximately 125 Hz. Alternatively, the numbers of bits used for reporting the magnitude of the detected displacement could be increased to eight bits and the reporting rate be decreased to approximately 60 Hz. One will however understand that an increased number of bits for reporting magnitude may require an increased accumulation capacity.

Besides conversion of the magnitude of the detected displacement to the reporting resolution, it is additionally useful to provide the post-processing unit with means for suppressing magnitudes of detected displacement that are detected to be lower than a determined output threshold so that they are not reported to the PC or external controller. Indeed, in order to prevent noisy data from being reported to the PC, an output threshold in terms of magnitude may be defined below which the magnitude is not reported. One will appreciate that such a feature can easily be implemented within post-processing unit 2 by providing a comparison mechanism that essentially consists in comparing the detected magnitude of displacement with a determined output threshold prior to reporting the detected displacement.

In addition, post-processing unit 2 may also implement an output gain function, i.e. a function for applying a gain factor to the magnitude of the detected displacement in order to "artificially" increase or decrease the magnitude of the detected displacement. This function can easily be implemented within post-processing unit 2 by providing a scaling mechanism that essentially consists in multiplying the detected magnitude of displacement with a determined gain factor prior to reporting the detected displacement.

We will now turn to an additional improvement of the above reporting and post-processing scheme. Due to the stochastic nature of the detection algorithm, some motion might still be reported by the motion sensing unit, even when the sensing device is in a no-motion state, i.e. when there is no displacement between the motion sensing unit and the illuminated surface. This phenomenon can be defined as zero motion drift.

Thanks to the above resolution conversion principle, the displacement reported by the motion sensing unit in the no-motion state does not usually accumulate up to the first level of motion reported to the PC or external controller (i.e. the least significant bit of the motion count reported by the post-processing unit). Indeed, as long as the magnitude of the detected displacement that is accumulated in the accumulation unit is below the minimum level of magnitude that can be reported at the selected reporting resolution, the motion count reported by the post-processing unit will be zero. This will be the case as long as the magnitude of the accumulated displacement remains below a determined count that is given by the ratio r1/r2 of the detection and reporting resolutions, i.e. the inverse of the above-mentioned resolution scaling factor. Taking the above numerical examples for the detection and reporting resolutions, the accumulated count below which motion reported by the post-processing unit will be zero is "±82" at a reporting resolution of 400 cpi and "±41" at a reporting resolution of 800 cpi.

The resolution conversion principle thus allows suppression of the above-mentioned zero motion drift. This might not always be the case however. For example, surfaces with low contrast cause more "noisy" motion and the detected displacement in the no-motion state might be accumulated beyond the first level of motion that is reported by the post-processing unit. This is highly not desirable and should be prevented.

Figure 4:
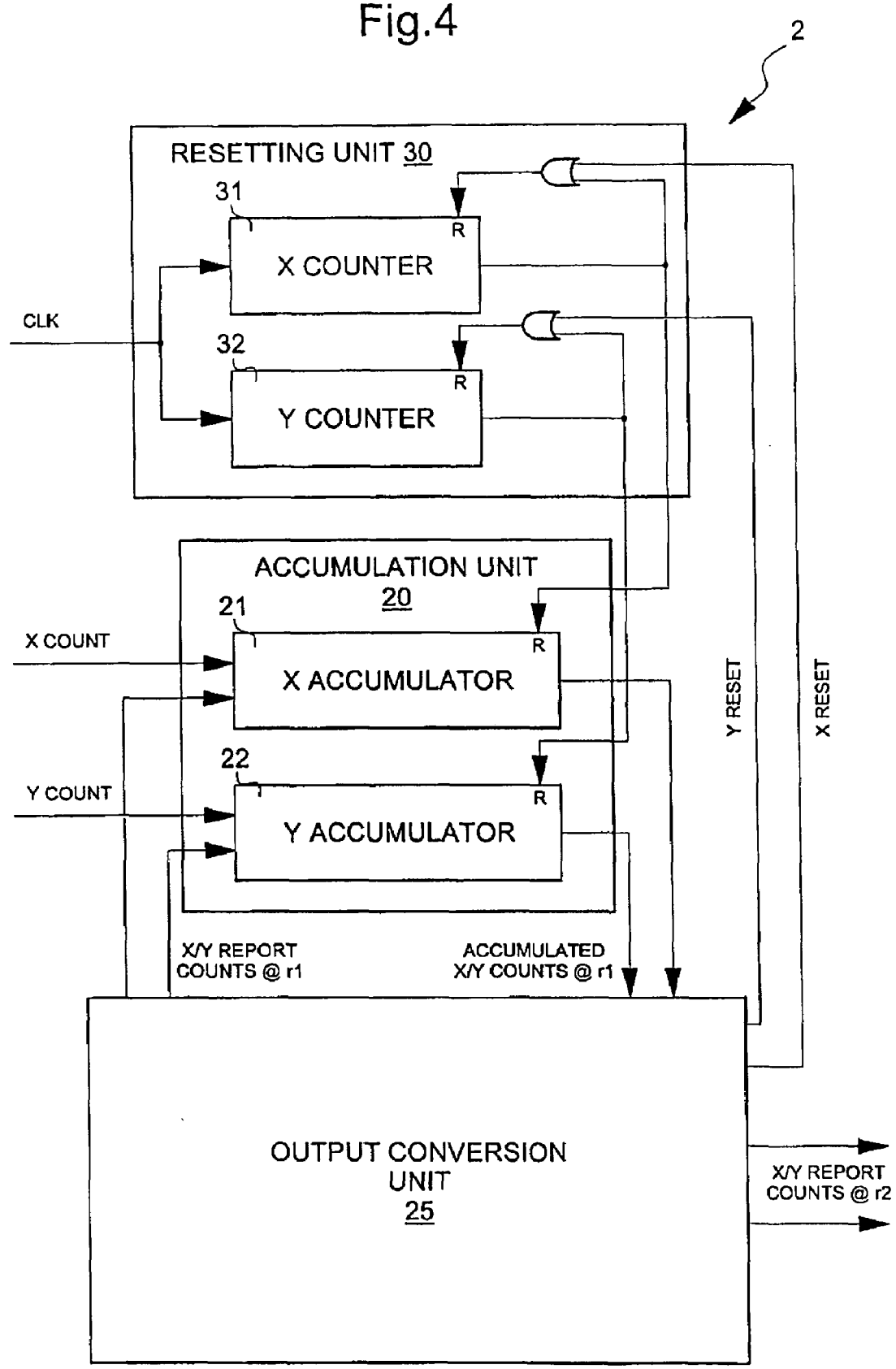
FIG. 4 is an illustration of another embodiment of the post-processing unit.

With reference to FIG. 4, one will now describe a principle which has as purpose to suppress the above-mentioned zero motion drift. FIG. 4 is similar to FIG. 2 and shows an embodiment of post-processing unit 2 including additional means for suppressing zero motion drift. The post-processing unit of FIG. 4 essentially differs from that illustrated in FIG. 2 in that it is provided with an additional unit designated by reference numeral 30 which is coupled to accumulation unit 20. The purpose of unit 30 is to ensure that in the no-motion state the motion accumulated in accumulation unit 20 will not reach a limit value which corresponds to the first level (i.e. one bit) of motion reported by post-processing unit 2. One way to do that is to periodically reset accumulation unit 20 when in the no-motion state before the limit value is reached. Unit 30 thus essentially acts as a resetting unit for periodically resetting accumulation unit 20 during the no-motion state.

One has to make sure that accumulation unit 20 is reset only when the sensor is still and that unit 30 does interfere with normal operations when the sensor is moving. The sensor may be assumed to be still if, during a determined period of time Q, all of the motion reports from post-processing unit 2 are zero. After the expiration of this period of time Q, accumulation unit 20 may be reset. Period of time Q should be chosen large enough to make sure that the sensor is not moving. On the other hand, it should be smaller than the time it takes to accumulate noisy zero motion above the first level of motion reported by post-processing unit 2.

Resetting unit 30 may accordingly be operated to perform a reset of accumulation unit 20 at a selected reset rate (i.e. the inverse of the above-mentioned period of time Q) that is lower than the reporting rate when the sensing device is determined to be in a no-motion state. A practical value for the reset rate which satisfies the above requirements can illustratively be between 1 and 10 Hz which is substantially lower than the above numerical example of 100 Hz for the reporting rate.

Period of time Q can be measured by providing a counter driven by a clock signal CLK and counting up to a determined count, or reset count, which is representative of the desired reset rate. In the embodiment of FIG. 4, two such counters are provided for each axis of displacement, i.e. a first counter 31 that is coupled to accumulator 21 and a second counter 32 that is coupled to accumulator 22. Each counter 31, 32 acts solely on the corresponding accumulator and does not affect operation of the other accumulator.

When a counter reaches the reset count, it resets itself as well as the corresponding accumulator. This is illustrated by the connection of each counter output to reset terminals, designated R, of the counter and of the corresponding accumulator. In order to ensure that counters 31, 32 of resetting unit 30 do not interfere with normal operations of the sensor, each counters 31, 32 is further reset each time post-processing unit 2 reports a non-zero motion count for the corresponding axis of displacement. In FIG. 4, this is illustrated by the provision by output conversion unit 25 of reset signals designated X RESET and Y RESET which become active and thereby reset the corresponding counter when a non-zero motion count is reported for the corresponding axis of displacement. One will thus understand that counters 31, 32 are reset if they reach the reset count or if a motion count different than zero for the corresponding axis of displacement is reported by output conversion unit 25, this being illustrated by OR gates coupled to the reset terminals of counters 31, 32.

By braking down resetting unit 30 into two independent parts, namely one counter for motion along axis x and a second counter for motion along axis y, one will understand that zero motion drift is suppressed independently for x motion reports and y motion reports. This can help rejecting y motion drift when motion takes place along axis x and vice versa.

Having described the invention with regard to certain specific embodiments, it is to be understood that these embodiments are not meant as limitations of the invention. Indeed, various modifications and/or adaptations may become apparent to those skilled in the art without departing from the scope of the invention as defined by the annexed claims.

What is claimed is:

1. A method of processing and reporting detected displacement in an optical pointing device comprising the steps of:
    a) detecting said displacement and accumulating a first count representative of a magnitude of the detected displacement in an associated accumulation unit, said first count representing the magnitude of the detected displacement at a first resolution;
    b) processing the first count accumulated in said accumulation unit to convert this first count into a report count representing the magnitude of the detected displacement at a second resolution lower than the first resolution;
    c) reporting said report count to a PC or an external controller; and
    d) repeating steps a) to c),
    wherein said second resolution is selectable between at least two predetermined resolutions including a low reporting resolution and a high reporting resolution, and
    wherein said report count is reported at a selected reporting rate, the value of said reporting rate being decreased when switching from said high reporting resolution to said low reporting resolution and increased when switching from said low reporting resolution to said high reporting resolution.

2. The method of claim 1, wherein converting the first count into said report count includes:
    multiplying the first count with a resolution scaling factor defined as the ratio of the second and first resolutions; and
    truncating the multiplied first count to an integer number.

3. The method of claim 2, farther comprising, prior to repeating steps a) to c), the step of subtracting the transmitted report count from said accumulation unit thereby leaving in said accumulation unit a residual count representative of a residual unreported magnitude of displacement, subsequent accumulation of the first count in said accumulation unit being performed starting from said residual count.

4. The method of claim 1, further including the step of suppressing magnitudes of detected displacement that are detected to be lower than a determined output threshold.

5. The method of claim 1, further including the step of applying a gain factor to the magnitude of the detected displacement in order to increase or decrease the magnitude of the detected displacement.

6. The method of claim 1, wherein step a) includes the step of accumulating a plurality of individual counts that are each representative of a magnitude of displacement that is less than a pixel pitch of a photodetector array of the optical pointing device.

7. The method of claim 6, wherein said plurality of individual counts are accumulated at a rate that is higher than a rate at which said report count is reported.

8. The method of claim 1, wherein said report count is reported at a selected reporting rate and said report count is zero as long as the first count is less than the ratio of the first and second resolutions,
    said method further comprising the step of resetting the accumulation unit at a selected reset rate which is lower than the reporting rate so that the report count remains zero when the optical pointing device is determined to be in a no motion state,
    said optical pointing device being determined to be in a no motion state if a determined number of report counts which are successively reported are all zero.

9. The method of claim 8, further including:
    i) providing a counter unit driven by a clock signal for counting up to a reset count representative of said reset rate;
    ii) resetting the counter unit if the report count is different than zero; and
    iii) resetting the accumulation unit and the counter unit if the counter unit reaches said reset count.

10. The method of claim 8, wherein the accumulation unit includes a first accumulator for accumulating a count representative of the magnitude of a first component of the detected displacement along a first axis of displacement and a second accumulator for accumulating a count representative of the magnitude of a second component of the detected displacement along a second axis of displacement, the counts accumulated in said first and second accumulators being processed to be respectively converted into first and second report counts respectively representing the magnitude of the said first and second components of the detected displacement at the second resolution, said first and second accumulators being reset independently of each other.

11. A sensing device for an optical pointing device comprising a motion sensing unit for detecting and measuring displacement with respect to an illuminated surface and a processing unit for processing and reporting the detected displacement, the processing unit including an accumulation unit for accumulating a first count representative of a magnitude of displacement detected and reported by said motion sensing unit, the first count being representative of the magnitude of the detected displacement at a first resolution, the processing unit further including means for converting the first count accumulated in said accumulation unit into a report count representative of the magnitude of the detected displacement at a second resolution lower than the first resolution, wherein said second resolution is selectable between at least two predetermined resolutions including a low reporting resolution and a high reporting resolution, and wherein said processing unit reports said report count at a selected reporting rate, the value of said reporting rate being decreased when switching from said high reporting resolution to said low reporting resolution and increased when switching from said low reporting resolution to said high reporting resolution.

12. The sensing device of claim 11, wherein the processing unit includes:

means for multiplying the first count with a resolution scaling factor defined as the ratio of the second and first resolutions, and for truncating the multiplied first count to correspond to an integer number; and means for subtracting the report count from said accumulation unit after reporting.

13. The sensing device of claim 11, wherein said processing unit further includes an output suppressing means for suppressing magnitudes of detected displacement that are lower than a determined output threshold.

14. The sensing device of claim 11, wherein said processing unit further includes an output gain controlling means for increasing or decreasing the magnitude of the detected displacement.

15. The sensing device of claim 11, wherein the accumulation unit includes a first accumulator for accumulating a count representative of the magnitude of a first component of the detected displacement along a first axis of displacement and a second accumulator for accumulating a count representative of the magnitude of a second component of the detected displacement along a second axis of displacement, and wherein the processing unit reports a first report count representative of the magnitude of the said first component of the detected displacement and a second report count representative of the magnitude of the said second component of the detected displacement.

16. The sensing device of claim 11, wherein said motion sensing unit includes a photosensitive array comprising a plurality of pixels and exhibiting a determined pixel pitch, and wherein said motion sensing unit reports individual counts that are each representative of a magnitude of displacement corresponding to a fraction of the pixel pitch, said individual counts being accumulated by said processing unit to form said first count.

17. The sensing device of claim 16, wherein the first resolution is defined by the following expression where r1 is the said first resolution, N0 is the number of bits for coding the magnitude of displacement reported and pp is the pixel pitch:

$$r1 = 2^{N0}/pp.$$

18. The sensing device of claim 11, wherein said report count is reported by said processing unit at a selected reporting rate and wherein said report count is zero as long as the first count is less than the ratio of the first and second resolutions, said processing unit further including a resetting unit for resetting the accumulation unit at a selected reset rate which is lower than the reporting rate so that the report count remains zero when the sensing device is determined to be in a no motion state, said sensing device being determined to be in a no motion state if a determined number of report counts which are successively reported by the processing unit are all zero.

19. The sensing device of claim 18, wherein said resetting unit includes a counter unit driven by a clock signal for counting up to a reset count representative of said reset rate, said counter unit being reset if the report count reported by the processing unit is different than zero or if the counter unit reaches the reset count; and said accumulation unit being reset if the counter unit reaches the reset count.

20. The sensing device of claim 19, wherein the accumulation unit includes a first accumulator for accumulating a count representative of the magnitude of a first component of the detected displacement along a first axis of displacement and a second accumulator for accumulating a count representative of the magnitude of a second component of the detected displacement along a second axis of displacement, wherein the processing unit reports a first report count representative of the magnitude of the said first component of the detected displacement and a second report count representative of the magnitude of the said second component of the detected displacement, and wherein said counter unit includes first and second counters driven by the clock signal for counting up to the reset count and which are respectively coupled to the first and second accumulators, said first or second counters being reset if the report count reported by the processing unit for the first or, respectively, second axis of displacement is different than zero, said first or second counter being also reset if it reaches the reset count, and said first or second accumulator being reset if the first or, respectively, second counter reaches the reset count.

21. The method of claim 1, wherein said displacement detection of step a) is determined at a flash rate greater than 4 kHz.

22. The method of claim 1, wherein said displacement detection of step a) is determined at a flash rate between 10 kHz and 20 kHz.

23. The method of claim 1, wherein said accumulation unit does not accumulate beyond a maximum count at a selected reporting resolution.

* * * * *